(12) United States Patent
Velusamy et al.

(10) Patent No.: US 9,596,162 B1
(45) Date of Patent: Mar. 14, 2017

(54) METHOD AND SYSTEM OF IMPOSING A POLICY RULE FOR HEAVY USAGE

(71) Applicant: Sprint Spectrum L.P., Overland Park, KS (US)

(72) Inventors: Saravana Velusamy, Olathe, KS (US); Rajil Malhotra, Olathe, KS (US); Naresh Madineni, Overland Park, KS (US); Deveshkumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 121 days.

(21) Appl. No.: 14/519,087

(22) Filed: Oct. 20, 2014

(51) Int. Cl.
*G06F 15/173* (2006.01)
*H04L 12/26* (2006.01)
*H04L 12/801* (2013.01)
*H04L 12/813* (2013.01)

(52) U.S. Cl.
CPC .......... *H04L 43/0894* (2013.01); *H04L 47/10* (2013.01); *H04L 47/20* (2013.01)

(58) Field of Classification Search
USPC ................................. 709/225, 224, 223, 230
See application file for complete search history.

(56) References Cited

U.S. PATENT DOCUMENTS

| 2010/0103820 | A1 | 4/2010 | Fuller et al. |
| 2013/0088956 | A1 | 4/2013 | Zhou et al. |
| 2013/0250750 | A1 | 9/2013 | Nishida et al. |
| 2014/0180738 | A1* | 6/2014 | Phillipps ............... G06N 99/005 705/7.12 |
| 2015/0156705 | A1* | 6/2015 | Punz ..................... H04W 48/10 370/328 |
| 2016/0094401 | A1* | 3/2016 | Anwar .................... G06F 11/00 709/223 |
| 2016/0094563 | A1* | 3/2016 | Arsanjani ............. H04L 63/107 726/4 |

OTHER PUBLICATIONS

U.S. Appl. No. 14/080,028, filed Nov. 14, 2013.

* cited by examiner

*Primary Examiner* — Lan-Dai T Truong (57) ABSTRACT

Disclosed is a method and system of imposing a policy rule for excessive usage in an access network. According to the disclosure, a policy enforcement point (PEP) may detect that usage by a given client device is threshold high and responsively request, from a policy decision point (PDP), a policy directive that specifies a policy rule to apply to the given client device. However, thereafter, the PEP may determine that the requested policy directive has not been received from the PDP and then responsively apply, to the given client device, a default policy rule for threshold-high usage.

17 Claims, 5 Drawing Sheets

METHOD AND SYSTEM OF IMPOSING A POLICY RULE FOR HEAVY USAGE

BACKGROUND

Unless otherwise indicated herein, the description provided in this section is not prior art to the claims and is not admitted to be prior art by inclusion in this section.

A telecommunication system typically includes an access network configured to provide client devices with connectivity to one or more transport networks. For example, a traditional landline telephone system may include an access network configured to provide landline telephones with connectivity to the public switched telephone network (PSTN). As another example, a wireless telecommunication system may include a radio access network configured to provide user equipment devices (UEs) with connectivity to one or more packet-switched networks (e.g., the Internet, a VoIP network, etc.) and/or circuit-switched networks (e.g., PSTN). Other examples are possible as well.

In practice, such an access network may include various entities that facilitate providing this connectivity between client devices and a transport network, examples of which may include base stations, controllers, gateways, or the like. Additionally, such an access network may include or have access to a policy management platform that is arranged to maintain and enforce policy rules for client devices being served by the access network. For instance, an access network may include (1) a policy decision point (PDP) that generally functions to maintain records of policy rules for client devices being served by the access network and (2) a policy enforcement point (PEP) that generally functions to enforce particular policy rules at various times while the access network is serving these client devices.

In one implementation of a policy management platform, the PDP may be the entity configured to decide which policy rule(s) should be applied while the access network is serving a client device. With this implementation, the PEP may not be configured to obtain a client device's record of policy rules from the PDP when the client device initially registers with the access network. Rather, when a circumstance arises that potentially calls for the potential application of a policy rule for the client device (e.g., when the client device attempts to access a transport network), the PEP may be configured to request a policy directive from the PDP, and the PDP may be configured to respond to the PEP's request with a policy directive that specifies which particular policy rule(s) (if any) should be applied by the PEP in that circumstance.

In another implementation of a policy management platform, the PDP may be the entity configured to decide which policy rule(s) should be applied while the access network is serving a client device. With this implementation, the PEP will be configured to obtain a client device's record of policy rules from the PDP when the client device initially registers with the access network. Then, when a circumstance arises that calls for the potential application of a policy rule for the client device (e.g., when the client device attempts to access a transport network), the PEP may be configured to decide which particular policy rule(s) (if any) should be applied in that circumstance without further consulting the PDP.

In practice, a client device's record of policy rules may generally define permissions, restrictions, and/or requirements relating to the configuration and operation of the access network when serving the client device, examples of which may include rules for managing the client device's access to particular resources, services, applications, and/or content, rules for managing quality of service (e.g., bit rate, priority level, packet delay, etc.) of communication with the client device, etc. These policy rules could be specific to a client device (e.g., based on a subscription level, device type, or the like), or could be generally applicable to various client devices served by the access network. Thus, as an access network serves a client device, communications to and from the client device may be subject to policy rules such as these that are maintained and applied by policy management platform.

OVERVIEW

In a network arrangement like those described above, there may be times when a client device's usage of network resources rises to an excessive level, which may lead to undesirable consequences. For instance, if a client device's usage reaches an excessive level, this may inhibit the access network's ability to adequately serve other client devices. Moreover, if a client device's usage reaches an excessive level and the network operator fails to provide the subscriber with a timely notification of this excessive usage, the network operator may not be permitted to bill the subscriber for such excessive usage, and thus the client device may be able to continue with its excessive usage without the subscriber fairly compensating the network operator.

Disclosed herein are methods and systems to help address these issues. In accordance with the disclosure, a PEP of an access network may be configured to monitor for excessive usage by client devices being served by the access network. If the PEP detects that the usage by a given client device has reached an excessive level, the PEP may then responsively request, from a PDP of the access network, a policy directive that specifies a policy rule to apply to the client device (e.g., a policy rule that imposes a limitation on the client device's usage). However, for various reasons, the PEP may not receive a policy directive from the PDP in response to the PEP's request. If this occurs, the PEP may then function to apply, to the client device, a default policy rule for excessive usage (e.g., a local policy rule that causes the PEP to limit the client device's usage). Thus, a PEP operating in accordance with the present disclosure may be able to prevent a client device's usage from reaching an excessive level and causing negative consequences such as those describe above.

Accordingly, in one respect, disclosed is a method that involves a PEP of an access network (a) detecting that usage by a given client device is threshold high, (b) in response to the detecting, requesting, from a PDP of the access network, a policy directive that specifies a policy rule to apply to the given client device (e.g., a policy directive that specifies a policy rule for restricting usage by the given client device), (c) thereafter determining that the requested policy directive has not been received from the PDP, and (d) in response to the determining, applying, to the given client device, a default policy rule for threshold-high usage (e.g., a default policy rule that is stored locally at the PEP and causes the PEP to impose a usage restriction on any client device identified as having threshold-high usage).

In another respect, disclosed is a PEP that includes (a) a network interface configured to facilitate communication with one or more entities of an access network (including a PDP), and (b) a controller configured to carry out the PEP functions disclosed herein.

These as well as other aspects, advantages, and alternatives will become apparent to those of ordinary skill in the art by reading the following detailed description, with ref-

DETAILED DESCRIPTION

Referring to the drawings, as noted above, FIG. 1 is a simplified block diagram of an example network arrangement in which features of the present disclosure can be implemented. It should be understood, however, that this and other arrangements described herein are set forth as examples only. As such, those skilled in the art will appreciate that other arrangements and elements (e.g., machines, interfaces, functions, orders of functions, etc.) can be used instead, some elements may be added, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware and/or software logic. For instance, various functions may be carried out by a processor executing instructions written in any suitable programming language and stored in memory.

Figure 1:
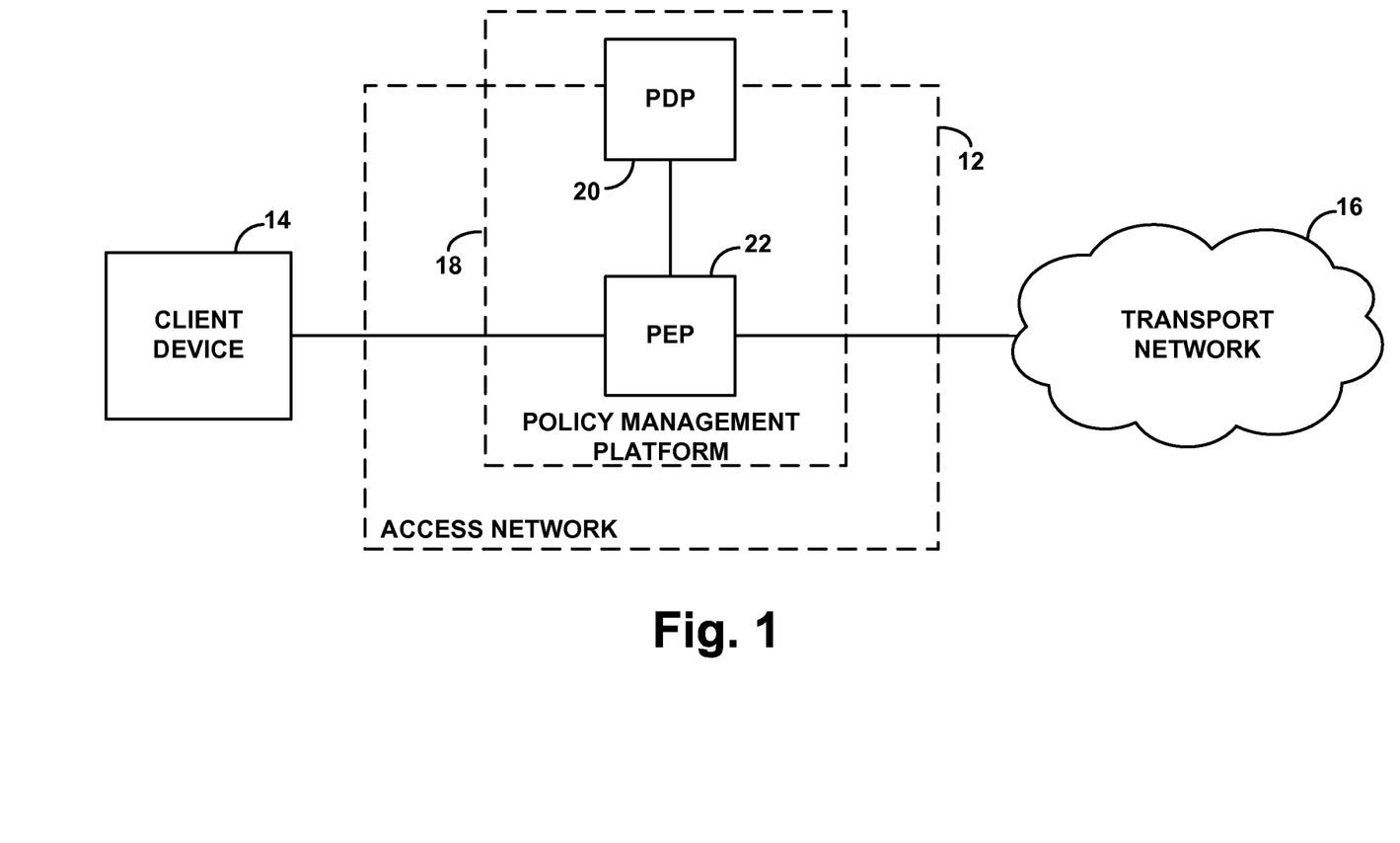
FIG. 1 is a simplified block diagram of a network arrangement in which features of the present disclosure can be implemented.

As shown in FIG. 1, the arrangement includes an access network 12 that functions to provide client devices with connectivity to one or more transport networks. In particular, access network 12 is shown providing a representative client device 14 with connectivity to a representative transport network 16. To facilitate providing this connectivity, the access network may include one or more components that engage in communications with client device 14 and transport network 16 and that bridge those communications together to allow the client device to engage in communications with entities on the transport network.

Access network 12 may be structured to provide various types of connectivity, such as landline, wireless, circuit-switched, and/or packet-switched, for various type of communications, such as voice and/or data for instance, and client device 14 and transport network 16 may be similarly configured. For instance, access network 12 could be a radio access network that provides connectivity with one or more packet-switched networks (e.g., the Internet, a VoIP network, etc.) and/or circuit-switched networks (e.g., the PSTN), in which case client device 14 could be a user equipment device (UE) that engages in wireless communication with the access network, and transport network 16 could be a given packet-switched or circuit-switched network. Alternatively, however, access network 12 could be a landline telephone network that provides circuit-switched connectivity for PSTN communications, in which case client device 14 could be a traditional landline telephone that engages in landline communication with the access network, and transport network 16 could be the PSTN. Other examples are possible as well.

As one specific example, access network 12 may be cellular wireless network that includes one or more wireless base stations arranged to serve client devices in accordance with an air interface protocol such as Orthogonal Frequency Division Multiple Access (OFDMA (e.g., Long Term Evolution (LTE) or Wireless Interoperability for Microwave Access (WiMAX)), Code Division Multiple Access (CDMA), Global System for Mobile Communications (GSM), WIFI, or the like, and a gateway (or the like) that connects with a transport network such as the Internet, the PSTN, a VoIP network, or the like. Representative client device 14 may then be a UE (e.g., a cellular telephone, a tablet or other wirelessly-equipped computer, mobile hotspot, etc.) that is configured to be served wirelessly by such a base station and to engage in voice and/or data communication via the base station and the gateway with entities on the transport network. Other examples are possible as well.

As shown in FIG. 1, access network 12 may then include or have access to a policy management platform 18 that is arranged to maintain and apply policy rules for client devices being served by the access network. As noted above, these policy rules may generally define permissions, restrictions, and/or requirements relating to the configuration and operation of the access network when serving the client device, examples of which may include rules for managing a client device's access to particular resources, services, applications, and/or content, rules for managing quality of service (e.g., bit rate, priority level, packet delay, etc.) for communication with the client device, etc. These policy rules could be specific to a client device (e.g., based on a subscription level, device type, or the like), or could be generally applicable to various client devices served by the access network. Thus, as access network 12 serves a client device, communications to and from the client device may be subject to policy rules such as these that are maintained and applied by policy management platform 18.

In practice, policy management platform 18 may include (1) a PDP 20 (which may also be referred to as a policy server) that generally functions to maintain records of policy rules (e.g., a service profile records) for client devices being served by access network 12 and (2) a PEP 22 that generally functions to apply policy rules as access network 12 serves the client devices. These entities may take various forms, and in some cases, may be implemented as functions of other entities in access network 12 (such as a gateway, a controller, a subscriber database, or the like). Other examples are possible as well.

According to one implementation of the policy management platform 18, the PDP may be configured to make the policy decisions and relay those decisions to the PEP, and the PEP may then be configured to simply enforce the policy decisions. For example, at various times while access network 12 is serving a client device (e.g., as the client device attempts to access a particular communication service), PEP 22 may send a request to PDP 20 for a policy directive. In practice, this request may include any additional information that the PDP may need to provide the requested policy directive. Upon receiving this request, PDP 20 may consult the policy rules for the client device to decide whether any policy rule currently applies, and if so, PDP may then send back to the PEP 22 a policy directive that specifies a given policy rule to be applied by the PEP.

According to another implementation of the policy management platform 18, the PDP may be configured to simply provide the PEP with relevant policy rules for the client device, and the PEP may then be configured both to make the policy decisions and to apply those decisions. For example, when the access network begins serving a client device, PEP 22 may function to obtain a record of the client device's relevant policy rules from PDP 20. Thereafter, at various times while access network 12 is serving the client device, PEP 22 may function to consult the policy rules for the client device to decide whether any policy rule currently applies, and if so, PEP 22 may then apply the policy rule. Other implementations may be possible as well.

Depending on the nature of the policy rules, the act of applying the policy rules may also take various forms. For example, if one of the policy rules is to limit a client device's data rate to a particular level, PEP 22 may apply that policy rule by imposing the data rate limitation for the client device. As another example, if one of the policy rules is to restrict a client device's access to a particular service, PEP 22 may apply that policy rule by prohibiting the client device from accessing that service. Many other examples are possible as well.

Figure 2:
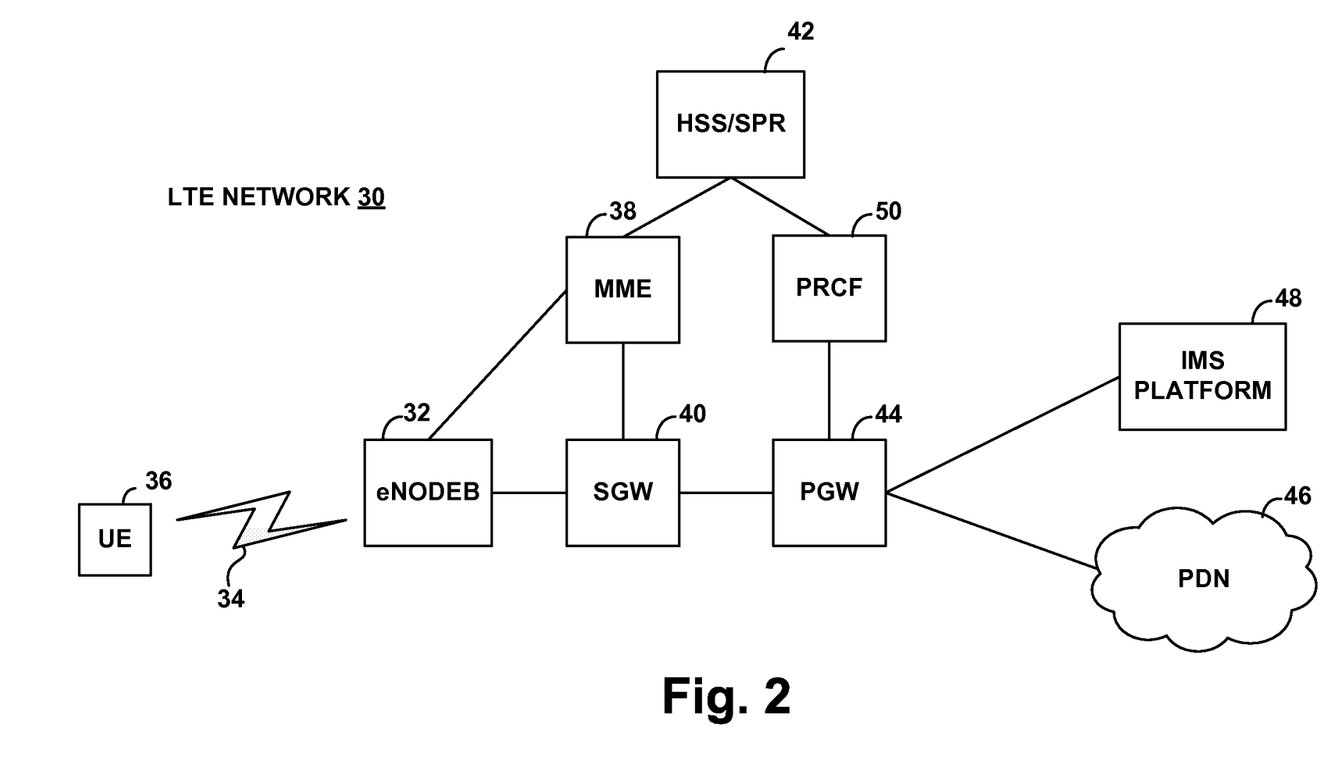
FIG. 2 is a simplified block diagram of a more specific network arrangement in which features of the present disclosure can be implemented.

FIG. 2 is next a more specific but still simplified depiction of a network arrangement in which in which features of the present disclosure can be implemented. In particular, FIG. 2 depicts the access network as a representative LTE network 30 that generally functions to provide UEs with wireless packet data communication service.

As shown, the LTE network includes an eNodeB 32, which has an antenna structure and associated equipment for providing an LTE coverage area 34 in which to serve UEs such as example UE 36. eNodeB 32 then has a communication interface with a mobility management entity (MME) 38 and with a serving gateway (SGW) 40. MME 38 may generally function as a signaling controller for the LTE network, and may have a communication interface both with SGW 40 and with a subscriber database system 42 that stores subscriber profiles for UEs registered with the LTE network. As shown in FIG. 2, this subscriber database system 42 may generally take the form of a home subscriber server (HSS) coupled to a subscriber profile repository (SPR) or the like. SGW 40 may in turn have a communication interface with a packet-data network gateway (PGW) 44 that provides connectivity to external packet-data networks and services. For instance, PGW 44 is shown as providing connectivity both with a representative packet-data network 46 (e.g., the Internet) and with an Internet Multimedia Subsystem (IMS) platform 48, which may provide access to particular packet-data services, such as VoIP voice service, over one or more other packet-data networks (not shown).

In accordance with the present disclosure, LTE network 30 may also include (and/or have access to) a policy management platform that is arranged to maintain and apply policy rules for UEs being served by LTE network 30. This policy management platform may generally include a PDP and a PEP, which may be implemented in various manners. For instance, in one typical implementation, the LTE network may include a policy charging and rules function (PCRF) that is configured to function as the PDP, and the LTE network's PGW may then be configured to function as the PEP. Such an implementation is depicted in FIG. 2, which shows a PCRF 50 that has a communication interface (e.g., a Gx interface) with PGW 44. However, the PDP and PEP may be implemented in other manners as well. For example, the PDP could be implemented in whole or in part on a subscriber database, such as HSS/SPR 42, and/or the PEP could be implemented in whole or in part on a controller, such as MME 38. Other examples are possible as well.

It should be understood that the illustrated components of LTE network 30 may sit as nodes on a core packet-switched network owned and operated by an LTE service provider, and thus the interfaces between the components could be logical communication interfaces on that packet-switched network.

With this arrangement, when a UE such as UE 36 first powers on or otherwise enters into coverage of LTE network 30, the UE may engage in a process of registering or "attaching" with the LTE network, which may trigger setup of various communication channels for UE 36 and/or reservation of various communication resources for UE 36. For instance, upon entering into coverage area 34, UE 36 may send an attach request to eNodeB 32, and the eNodeB may then forward this attach request to MME 38. MME 38 may then engage in signaling with HSS/SPR 42 to authorize and authenticate UE 36 and to obtain service profile data for UE 36, which the MME may store as a local context record for the UE. Additionally, MME 38 may engage in signaling with eNodeB 32 and with SGW 40, which may in turn engage in signaling with PGW 44, to set up one or more bearer connections (or "bearers") that define logical communication tunnels for carrying data traffic between UE 36 and PGW 44 through LTE network 30. For example, LTE network 30 may initially establish a default bearer for carrying general Internet traffic (e.g., web browsing, e-mail messaging, or the like) between UE 36 and packet-data network 46. As another example, if UE 36 subscribes to an IMS-based service such as VoIP, LTE network 30 may initially establish an IMS signaling bearer for carrying control signaling (such as Session Initiation Protocol (SIP) signaling) between UE 36 and IMS platform 48 to facilitate setup of IMS-based communications.

As part of this initial bearer setup process, PGW 44 may also engage in signaling (e.g., Diameter signaling) with PCRF 50 to request and obtain policy directives for UE 36. For example, PGW 44 may query PCRF 50 to request a policy directive related to establishment of a given bearer for UE 36, such as a policy directive that specifies whether or not PGW 44 should establish a given bearer for UE 36 and also potentially specifies other permissions, restrictions, and/or requirements for PGW 44 to apply when serving UE 36 over the given bearer. Other examples are possible as well.

After this initial bearer setup process, LTE network 30 may then begin serving UE 36. For instance, the LTE network 30 may begin to facilitate the exchange of general Internet traffic between UE 36 and packet-data network 46 over the default bearer. Additionally, the LTE network 30 may begin to facilitate the exchange of control signaling between UE 36 and IMS platform 48 over the IMS signaling bearer. In this respect, if UE 36 engages in session setup signaling with IMS platform 48 over the IMS signaling bearer for purposes of setting up a VoIP call or other packet-based real-time media session, the LTE network 30 may also then establish a dedicated IMS bearer for carrying media content of the session, such as VoIP voice packets, between UE 36 and IMS platform 48. And line with the discussion above, as part of this process, PGW 44 may again engage in signaling with PCRF 50 to request a policy directive related to establishment of the dedicated IMS bearer for UE 36.

As noted above, in network arrangements such as those depicted in FIGS. 1 and 2, there may be times when a given client device's usage of network resources rises to an excessive level. For instance, in the LTE network 30 depicted in FIG. 2, there may be times when the usage by UE 36 reaches an excessive level. This may lead to various negative consequences. For instance, this excessive usage by UE 36 may inhibit the LTE network's ability to adequately serve other UEs operating in coverage area 34. Moreover, if the operator of LTE network 30 fails to timely notify the UE's subscriber of this excessive usage (e.g., due to delays or failures in signaling with the network's billing system), the operator may not be permitted to bill the subscriber for such excessive usage, and thus UE 36 may be able to continue with its excessive usage without the subscriber fairly compensating the operator of LTE network 30. Disclosed herein are functions that help to address these issues.

Figure 3:
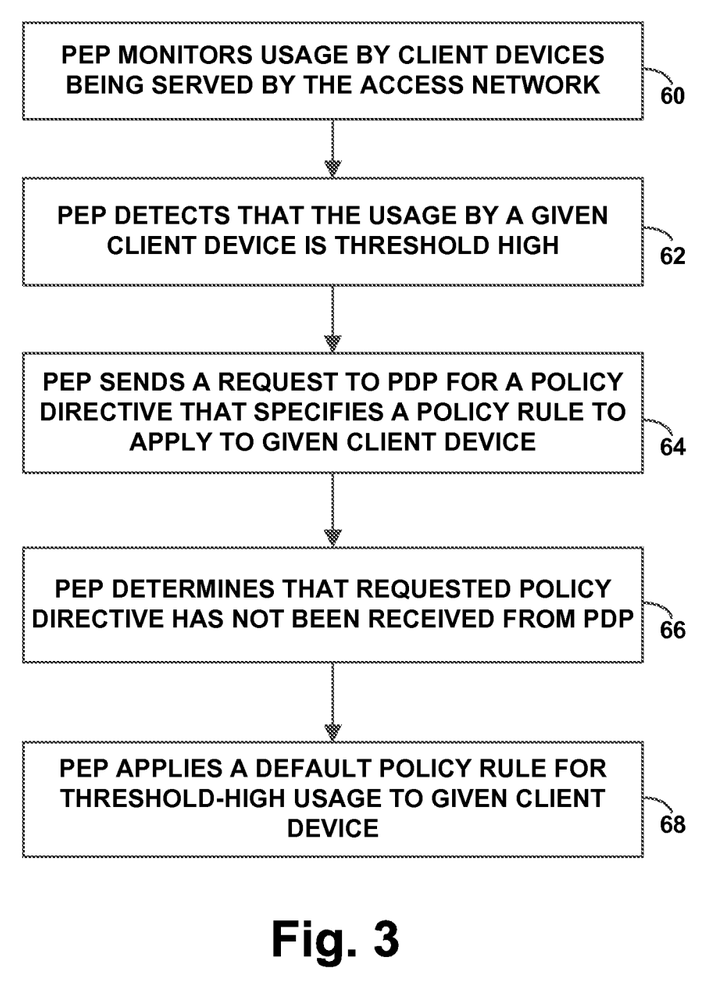
FIG. 3 is a flow chart depicting functions that can be carried out in accordance with the present disclosure.

FIG. 3 is next a flow chart depicting functions that can be carried out in accordance with the present disclosure by a PEP of an access network, such as a PGW of an LTE network. As shown in FIG. 3, at block 60, a representative method may begin with the PEP monitoring usage by client devices being served by the access network.

In practice, the PEP may monitor a client device's usage by periodically (e.g., in accordance with a schedule, in response to a triggering event, etc.) evaluating a metric that represents the client device's usage. This metric could take various forms. For example, the PEP may periodically evaluate a tonnage parameter for the client device, which generally represents an amount of data exchanged with the client device over a period of time. As another example, the PEP may periodically evaluate a speed parameter for the client device, which generally represents a data rate delivered to the client device at a particular instant in time. As yet another example, the PEP may periodically evaluate a time parameter, such as a parameter that represents an amount of time that the client device has engaged in bearer communication with the access network over a period of time. The PEP may monitor a client device's usage in other manners as well.

At block 62, while monitoring the usage by client devices being served by the access network, the PEP may detect that the usage by a given client device is threshold high. This act of detecting a client device's threshold-high usage may take various forms.

According to one implementation, while monitoring a client device's usage by client devices being served by the access network, the PEP may compare the metric representing the client device's usage to a threshold that is deemed to represent excessive usage by a client device. In general, this threshold may be a configurable parameter that is represented according to the same metric used to represent the client device's usage (e.g., tonnage, speed, usage time, etc.). Further, this threshold either could be predefined or could be defined dynamically based on current network statistics (e.g., the aggregate usage by all client devices being served by the access network). Based on the comparison, the PEP may then determine that the metric representing the client device's usage exceeds the threshold and thus that the client device's usage is threshold high. The PEP may detect that the client device's usage is threshold high in other manners as well.

At block 64, in response to detecting that the client device's usage is threshold high, the PEP may send a request to a PDP of the access network for a policy directive that specifies a policy rule to apply to the given client device. In general, this request may serve as a query for any policy rule(s) invoked by the given client device's threshold-high usage. As such, the request may include any information that may facilitate such a query, examples of which may include an identifier of the client device, an indication of the client device's current usage level, etc. The request may take other forms and include other information as well.

In some circumstances, after sending the request for the policy directive, the PEP may then receive from the PDP a policy directive that specifies a policy rule to apply to the given client device. For instance, the PEP may receive a policy directive that specifies a new restriction on the client device's usage, such as a new data rate cap for the given client device (e.g., an lower aggregate maximum bit rate (AMBR) value) or some other new quality of service parameter for the given client device (e.g., a different QoS Class Indicator (QCI)). The policy directive received from the PDP may could take other forms as well.

In these circumstances, the PEP may then proceed to enforce the particular policy rule specified by the policy directive (e.g., by imposing the new data rate cap or other new quality of service parameter during communication with the given client device).

However, in other circumstances, after sending the request for the policy directive, the PEP may not receive the requested policy directive back from the PDP. There could be various reasons for this. As one example, it is possible that the PEP's request never even reached the PDP due to a failure in the communication path from the PEP to the PDP (which could include one or more other intermediate signaling entities). As another example, it is possible that the PDP did receive the PEP's request and send back the requested policy directive, but that the policy directive never reached the PEP due to a failure in the communication path from the PDP to the PEP (which again could include one or more other intermediate signaling entities). As yet another example, it is possible that the PDP was unable to generate the requested policy directive due to some sort of error condition at the PDP (e.g., a failure in the communication path between the PDP and the subscriber database). There could also be many other reasons why the PEP may not receive the requested policy directive back from the PDP.

When such a circumstance arises, at block 66, the PEP may determine that the requested policy directive has not been received from the PDP. The PEP may make this determination in various manners. In one implementation, the PEP may make this determination based on a timer. For instance, when the PEP sends the request for the policy directive, the PEP may begin a timer that allots a particular amount of time for receiving the requested policy directive back from the PDP, and the PEP may then determine that the requested policy directive has not been received from the PDP when this time expires. In another implementation, the PEP may make this determination in response to receiving an error message from the PDP (e.g., a message indicting that the PDP was unable to generate the requested policy directive). The PEP may determine that the requested policy directive has not been received from the PDP in other manners as well.

At step 68, in response to determining that the requested policy directive has not been received from the PDP, the PEP may then apply a default policy rule for threshold-high usage to the given client device. In a preferred implementation, this default policy rule will be stored locally at the PEP. However, in alternate implementations, the default policy rule may be stored at another entity that is accessible by the PEP.

In general, the default policy rule may define a restriction on the usage by a client device that has been identified as having threshold-high usage. Such a default policy rule may take various forms. As one example, the default policy rule may define a single restriction (e.g., a single, default data rate cap, a single, default QCI, or the like) that applies to any client device identified as having threshold-high usage. As another example, the default policy rule may define different tiers of restrictions that correspond to different levels of threshold-high usage (e.g., a first data rate cap for a first level of usage, a second data rate cap for a second level of usage, etc.). Other examples are possible as well.

In line with the discussion above, depending on the nature of the default policy rule, the act of applying that default policy rule to the given client device may then take various forms. As one example, if the default policy rule defines a particular data rate restriction, the PEP may apply that policy rule by imposing the data rate restriction for the given client device. Other examples are possible as well.

At some later point in time, the PEP may also determine that the given client device's usage is no longer threshold high. For example, while monitoring the given client device's usage as describe above with reference to block 60, the PEP may determine that the metric representing the given client device's usage has fallen below the threshold. In response to this determination, the PEP may stop applying the default policy rule to the given client device. Instead of applying the default policy rule, the PEP could then take several different actions, examples of which may include applying the policy rule(s) for the given client device that were in place prior to applying the default policy rule, requesting that the PDP provide an updated policy directive for the given client device, and/or applying a default policy rule for "normal" usage.

Figure 4:
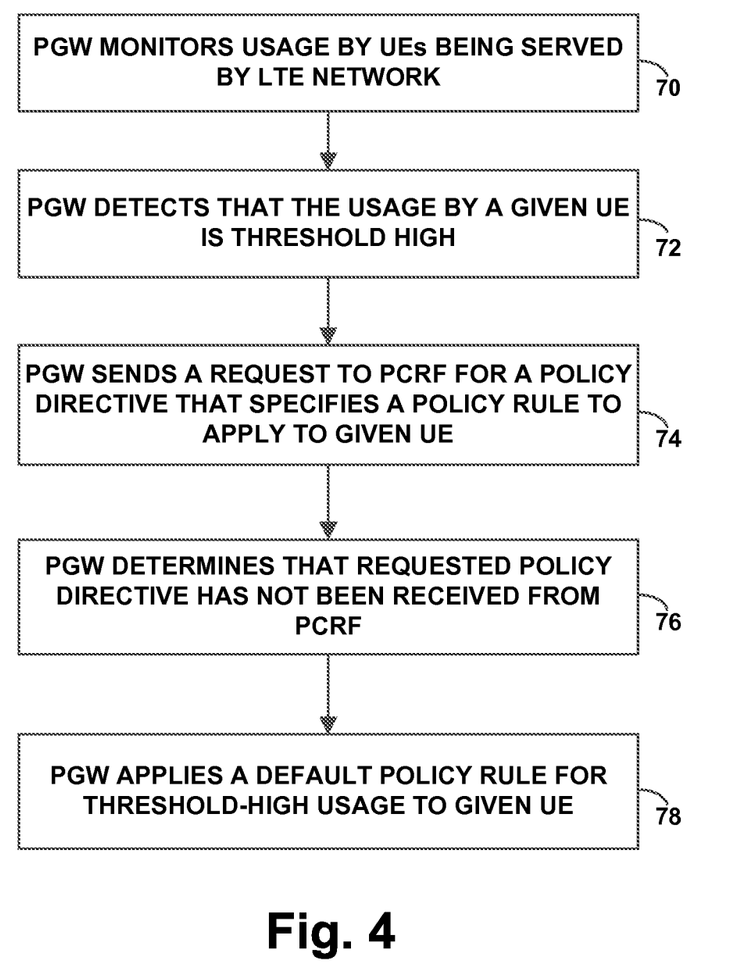
FIG. 4 is another flow chart depicting functions that can be carried out in accordance with the present disclosure.

FIG. 4 is now another flow chart depicting an example implementation of the functions of FIG. 3 described with reference to the more specific network arrangement of FIG. 2.

As shown in FIG. 4, at block 70, this example implementation may begin with PGW 44 monitoring usage by UEs being served by LTE network 30. At block 72, PGW 44 may then detect that the usage by a given UE, such as UE 36, is threshold high.

At block 74, in response to detecting that the usage by UE 36 is threshold high, PGW 44 may send a request to PCRF 50 for a policy directive that specifies a policy rule to apply to UE 36. As one possible example, this request may take the form of a CCR-U message with an Attribute Value Pair (AVP) configured to indicate that the given client device's usage is threshold high.

In some circumstances, PGW 44 may then receive the requested policy directive back from PCRF 50. As one possible example, this policy directive may take the from of a CCA-U message that specifies a policy rule to apply to UE 36 now that the UE's usage is threshold high. (Prior to sending the policy directive, PCRF 50 may also be configured to engage in signaling with one or more other entities to confirm that the usage by UE 36 is indeed threshold high).

However, in other circumstances, PWG may not receive the requested policy directive back from PCRF 50. In such a circumstance, at block 76, PGW 44 may determine that the requested policy directive has not been received from PCRF 50.

At block 78, in response to determining that the requested policy directive has not been received from PCRF 50, PGW 44 may then apply a default policy rule for threshold-high usage to UE 36, which may cause PGW 44 to begin restricting the UE's usage.

Figure 5:
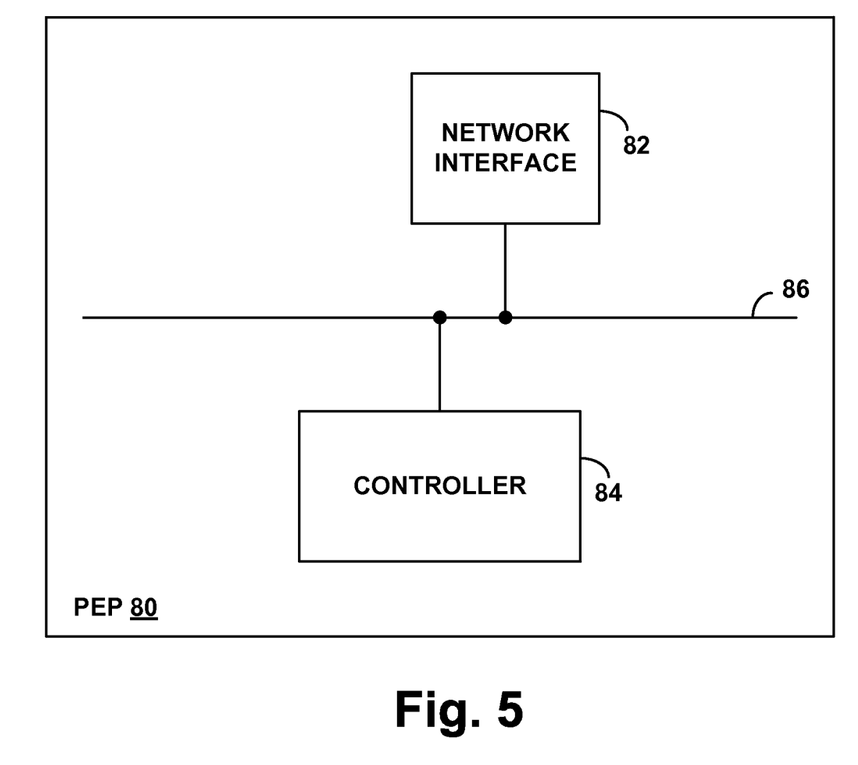
FIG. 5 is a simplified block diagram of an example PEP operable in accordance with the disclosure.

FIG. 5 is next a simplified block diagram of an example PEP 80, showing some of the functional components that may be included in such an entity to facilitate implementation of the functions described herein. As shown in FIG. 5, PEP 80 includes a network communication interface 82 and a controller 84, with various ones of these or other components being communicatively linked together by a system bus, network, or other connection mechanism 86.

Network communication interface 82 functions to facilitate communication with various other network entities, such as a PDP for instance. As such, the interface may include one or more network interface modules, such as Ethernet network interface modules for instance or may take any of a variety of other forms, supporting wireless and/or wired communication with these and other components.

Controller 84 may then be configured to carry out the PEP functions described above. For instance, the controller 84 may be configured to detect that usage by a given client device is threshold high, request a policy directive that specifies a policy rule for the given client device, determine that the requested policy directive has not been received, and then apply a default policy rule to the given client device.

Controller 84 could be implemented using hardware, software, and/or firmware. For example, controller 84 could include one or more general-purpose and/or special-purpose processors and a non-transitory computer readable medium (e.g., volatile and/or non-volatile memory and/or other data storage elements) that stores executable instructions. The executable instructions, when executed by the one or more processors, may cause controller 84 (and thus PEP 80) to perform any of the PEP functions described herein. Additionally, the non-transitory computer readable medium may also store reference data, such as the default policy rule for threshold-high usage.

Exemplary embodiments have been described above. Those skilled in the art will understand, however, that changes and modifications may be made to these embodiments without departing from the true scope and spirit of the invention, which is defined by the claims.

We claim:

1. A method comprising:
    at a policy enforcement point (PEP) of an access network, detecting that usage by a given client device is threshold high;
    in response to the detecting, the PEP requesting, from a policy decision point (PDP) of the access network, a policy directive that specifies a policy rule to apply to the given client device;
    the PEP thereafter determining that the requested policy directive has not been received from the PDP, wherein determining that the requested policy directive has not been received from the PDP is based on (i) a timer or (ii) receiving an error message from the PDP; and
    in response to the determining, the PEP applying, to the given client device, a default policy rule for threshold-high usage.

2. The method of claim 1, wherein detecting that usage by the given client device is threshold high comprises determining that a usage parameter for the given client device exceeds a threshold.

3. The method of claim 2, wherein the threshold comprises a value that is defined based on an aggregate of respective usage parameters for all client devices being served by the access network.

4. The method of claim 1, wherein the requested policy directive comprises a policy directive that specifies a policy rule for restricting usage by the given client device.

5. The method of claim 1, wherein the default policy rule is stored locally at the PEP.

6. The method of claim 1, wherein the default policy rule comprises a data rate restriction for any client device identified has having threshold-high usage.

7. The method of claim 1, wherein applying the default policy rule to the given client device comprises restricting the usage by the given client device.

8. The method of claim 1, wherein the PEP comprises a packet data network gateway (PGW) and the PDP comprises a policy charging and rules function (PCRF).

9. A method comprising:
at a packet data network gateway (PGW), detecting that usage by a given user equipment device (UE) is threshold high;
in response to the detecting, the PGW requesting, from a policy charging and rules function (PCRF), a policy directive that specifies a policy rule to apply to the given UE;
the PGW thereafter determining that the requested policy directive has not been received from the PCRF, wherein determining that the requested policy directive has not been received from the PCRF is based on (i) a timer or (ii) receiving an error message from the PCRF; and
in response to the determining, the PGW applying, to the given UE, a default policy rule for threshold-high usage.

10. The method of claim 9, wherein the requested policy directive comprises a policy directive that specifies a policy rule for restricting usage by the given UE.

11. The method of claim 9, wherein the PGW requesting, from the PCRF, the policy directive that specifies a policy rule to apply to the given UE comprises the PGW sending, to the PCRF, a CCR-U message with an Attribute Value Pair (AVP) configured to indicate that the usage by the given UE is threshold high.

12. The method of claim 9, wherein the default policy rule is stored locally at the PGW.

13. The method of claim 9, wherein the default policy rule comprises a data rate restriction for any UE identified has having threshold-high usage.

14. The method of claim 9, wherein applying the default policy rule to the given UE comprises restricting the usage by the given UE.

15. A policy enforcement point (PEP) comprising:
a network interface; and
a controller comprising one or more processors, non-transitory computer readable medium, and instructions stored on the non-transitory computer readable medium and executable by the one or more processors to carry out functions including:
(i) detecting that usage by a given client device is threshold high;
(ii) in response to the detecting, requesting, from a policy decision point (PDP) via the network interface, a policy directive that specifies a policy rule to apply to the given client device;
(iii) thereafter determining that the requested policy directive has not been received from the PDP, wherein determining that the requested policy directive has not been received from the PDP is based on (a) a timer or (b) receiving an error message from the PDP; and
(iv) in response to the determining, applying, to the given client device, a default policy rule for threshold-high usage.

16. The PEP of claim 15, wherein the default policy rule is stored locally at the PEP.

17. The PEP of claim 15, wherein the default policy rule comprises a data rate restriction for any client device identified has having threshold-high usage.

* * * * *